US007029757B1

(12) United States Patent
Levy

(10) Patent No.: US 7,029,757 B1
(45) Date of Patent: Apr. 18, 2006

(54) METHOD FOR PRODUCING SECURITY MARKS AND SECURITY MARKS

(75) Inventor: Michel Levy, Esch-sur-Alzette (LU)

(73) Assignee: GAJ Developpement SAS, (FR)

( * ) Notice: Subject to any disclaimer, the term of this patent is extended or adjusted under 35 U.S.C. 154(b) by 206 days.

(21) Appl. No.: 10/048,518

(22) PCT Filed: Jul. 28, 2000

(86) PCT No.: PCT/EP00/07322

§ 371 (c)(1),
(2), (4) Date: May 22, 2002

(87) PCT Pub. No.: WO01/08901

PCT Pub. Date: Feb. 8, 2001

(30) Foreign Application Priority Data

Jul. 30, 1999 (LU) ....................................... 90424

(51) Int. Cl.
*B32B 9/04* (2006.01)

(52) U.S. Cl. ................... 428/458; 428/195.1; 428/480; 283/72; 283/74; 283/94; 283/107; 283/109

(58) Field of Classification Search ................ 428/458, 428/432, 433, 195, 480; 283/72, 74, 83, 283/94, 107, 110
See application file for complete search history.

(56) References Cited

U.S. PATENT DOCUMENTS

| | | | | |
|---|---|---|---|---|
| 5,112,672 A * | 5/1992 | Kaule et al. | ................ | 428/209 |
| 5,324,079 A * | 6/1994 | Kaule et al. | .................. | 283/82 |
| 5,634,669 A * | 6/1997 | Colgate, Jr. | .................. | 283/58 |
| 5,876,068 A * | 3/1999 | Schneider et al. | ............ | 283/86 |

FOREIGN PATENT DOCUMENTS

| | | |
|---|---|---|
| FR | 2780915 | 1/2000 |
| WO | 95/27925 | 10/1995 |

* cited by examiner

*Primary Examiner*—Stephen Stein
(74) *Attorney, Agent, or Firm*—Andrus, Sceales, Starke & Sawall, LLP

(57) ABSTRACT

The invention concerns a method for producing security marks on a support having a first face and a second face opposite said first face which consists in the following steps: high resolution printing with a varnish on the support first face; treating the support by electrolysis; washing and drying the support.

19 Claims, 9 Drawing Sheets

Fig. 6
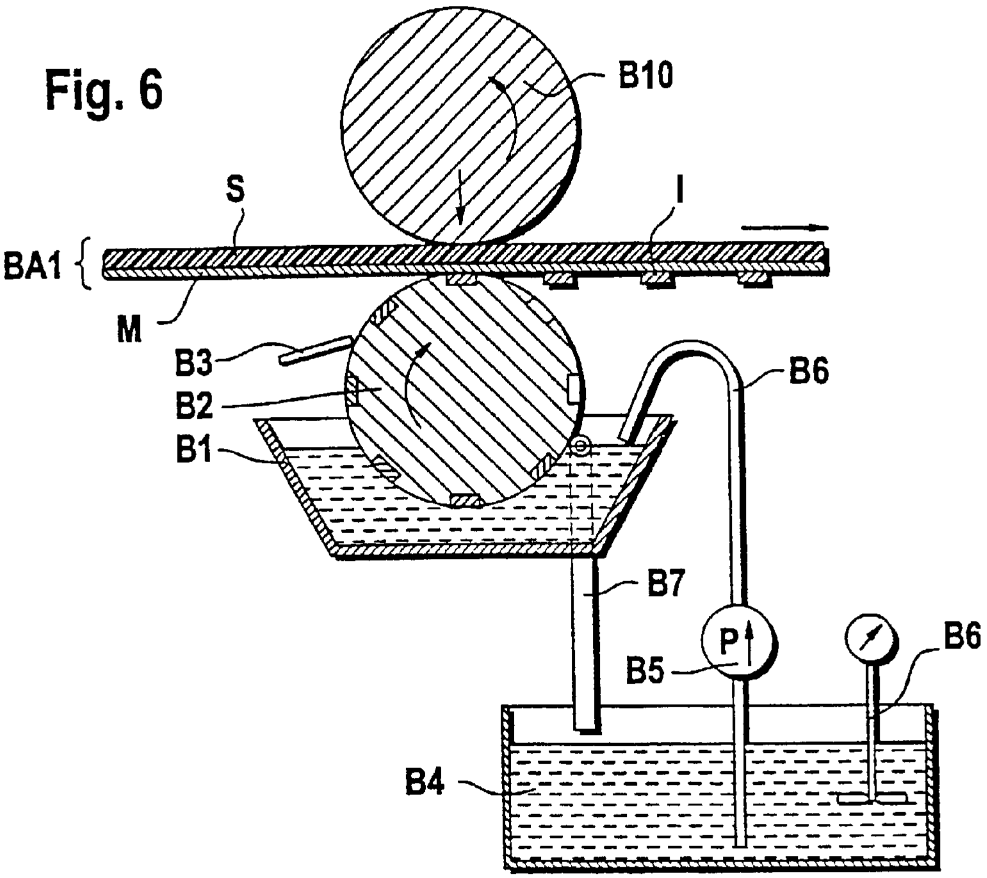
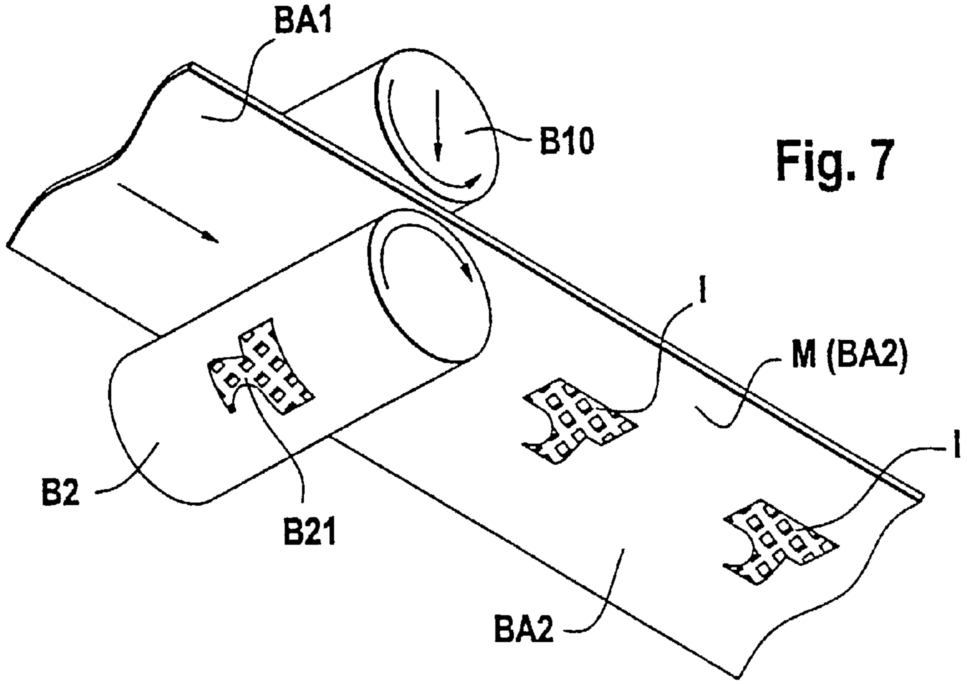
Fig. 7

METHOD FOR PRODUCING SECURITY MARKS AND SECURITY MARKS

CROSS REFERENCE TO RELATED APPLICATION

The present application is the U.S. national stage application of International Application PCT/EP00/07322, filed Jul. 28, 2000, which international application was International Application claims priority of Luxembourg Patent Application 90424, filed Jul. 30, 1999.

This is a 371 of PCT/EP00/7322 filed Jul. 28, 2000 which claims priority of Luxembourg Patent Application 90424, filed Jul. 30, 1999.

This invention concerns a manufacturing process for security marks to protect products and also security marks.

STATE OF THE ART

The development of reprographic techniques is making it increasingly easy to copy or forge documents, in particular fiduciary papers, banknotes, stamps, etc.

In order to verify the authenticity of a product, the identifying elements carried by the product are checked. Such identifying elements generally comprise marks integrated within the product that can only be read by a detector. Verification involves comparing the type, shape and positioning of the identifying elements with specimen identifying elements inaccessibly and/or inviolably stored in a memory inside the verifying device. This is the procedure with products such as banknotes. Such products comprise marks and check elements that are integrated within the notes and can generally be read with the aid of luminous radiation of a specific wavelength, preferably in the non-visible light range.

However, improvements in means of analysis available on the market are making it more and more difficult to take effective countermeasures, that is to say, means of preventing unauthorised persons from detecting and analysing the marks and identifying elements and subsequently using that knowledge to forge products by incorporating identifying elements which, when read by a detector, are interpreted by the detector as genuine identifying elements.

In the field of security of identification, it is certainly possible, by deploying sophisticated means, to make an object or product hard to forge or, at least, to make forgery sufficiently difficult to be no longer cost-effective.

The same cannot be said of products that are manufactured or used in very large numbers, such as banknotes or fiduciary papers, for instance: in this case, the cost of manufacture and in particular the cost of the security devices must be kept within limits. In other words, in the case of such products, the security devices or anti-forgery devices must be suitable for integration into an industrial process and must be compatible with industrial conditions of implementation. The manufacturing cost involved must be reasonable.

At present, therefore, banknotes, fiduciary papers, stamps, etc. are printed by conventional printing techniques offering limited scope for precision printing and positioning of identifying elements.

The integration of identifying elements in the form of holograms is subject to the same physical limits of error and thus does not offer the necessary security.

OBJECT OF THE INVENTION

The object of this invention is to present a process by which products can be made considerably more secure against forgery.

GENERAL DESCRIPTION OF THE INVENTION CLAIMED, INCLUDING THE MAIN ADVANTAGES

According to the invention, this aim is achieved by a manufacturing process for security marks on a medium having a first surface and a second surface opposite said first surface comprising the following stages:

high-resolution printing of a varnish on the first surface of the medium;

treatment of the medium by electrolysis;

washing and drying of the medium.

High-resolution printing makes for high precision in the making and positioning of the security marks. A genuine product, that is, one which carries an authentic mark, can be recognized with a security which is increased by several orders of magnitude.

The mark can be used as it is, or it may be transferred to the surface and/or into the core of the material to make it more secure and for authentication purposes.

The precision with which the mark is made also allows a more complex shape, i.e. the outline, the inclusions and resists, or more complex placing of the identifying elements and, above all, it enables identifying elements to be integrated that are only detectable or perceptible in conditions compatible with the precision of manufacture.

Before printing, the medium is preferably coated on the first surface. The coating preferably comprises one or more metals, one or more oxides, one or more metallic salts or metalloids or a mixture of these.

Between the coating and the varnish, an intermediate separating layer and/or an intermediate relief layer can be deposited. The latter advantageously facilitates the creation of micro-reliefs by stamping. The intermediate layers form protective layers for the security mark and give it abrasion resistance and rubbing resistance, for example.

The intermediate layer is able to carry, while ensuring good adhesion, another intermediate layer, achieving transparency that does not impair the final appearance of the mark.

The intermediate layer advantageously comprises variable diffracting optical motifs and/or holograms.

High-resolution printing is preferably carried out using an electrically insulating varnish.

The varnish advantageously comprises a polymer, preferably of the cellulose and/or metal and/or plastic and/or vacuum metallized plastic type.

The polymer for example comprises a mixture of nitrocellulose resins, preferably nitroalcohols, with the addition of resins to improve varnish resistance to subsequent treatments, such as gum arabic and rosin, etc. The polymer can also comprise a mixture of resins with the addition of one or more adhesion promoters, preferably butyl acetate tartaniate.

Alternatively, the varnish is insoluble and comprises nitrocellulose polymers comprising a charge which varies according to the subsequent function of the mark, in particular conductive or insulating pigments or charges such as metal oxides, preferably oxides of titanium, iron, boron, nickel, chromium, carbon, silica, etc. used in pure form or in a mixture.

The varnish is advantageously deposited by any printing process that can deposit varnish with great precision and high resolution.

In a preferred embodiment, the varnish is deposited by means of photogravure printing.

Photogravure allows high-resolution printing without indentation. The precision of printing thus allows the precision of detection to be enhanced in a way that is not suspected and, on the other hand, allows increased precision or reduction in size of the identifying elements whereas, hitherto, said precision was considerably limited by the risk of error associated with lack of manufacturing precision. Said precision allows multiple identifying elements to be camouflaged more readily; these are imperceptible in normal conditions of analysis, because they are not to be suspected, and they lie a good way beyond the limits of error currently conceivable. Finally, said very high precision makes it possible to increase the number of mark elements and increase security against forgery commensurately.

The varnish deposited on the base deposit is advantageously treated so as to modify its pattern, either by addition of material or by ablation. Material may be added by any printing process preferably using ink jet devices. Ablation can be performed by any means of localised destruction preferably by laser etching by a beam passing through a screen comprising windows or by a brush which is guided to draw lettering or graphics which can be variable with no contact with the metal film. In this way, constant and/or variable motifs can be included in the varnish, such as numbering, indexing, customisation, etc.

In another preferred embodiment, the varnish is deposited by means of digital printing. Digital printing possibilities include those which effect printing by applying ink or a coating, such as ink jet printing, liquid, solid or dry toner printing, elcography, with or without contact with the base deposit. The use of digital printing allows small production runs to be manufactured and enables designs that vary partly to be produced, such as numbering for instance. Moreover, digital printing avoids some of the drawbacks of photogravure printing, such as the making of an expensive printing form, which in some cases causes a long manufacturing lead-time. Digital printing is thus simpler, faster and cheaper than photogravure printing, while nonetheless retaining high resolution.

In an advantageous embodiment, the varnish contains a charge. This charge can for example contain a marker. Said marker can comprise micro-globules, preferably under 1 μm in size. Being so small, the micro-globules are undetectable to the naked eye. However, they are detectable by microscope in a narrow pass-band light, for example fluorescent in UVA lighting.

Stable trace elements, such as a DNA chain, are advantageously incorporated with the micro-globules. Said molecules are preferably coated with a protective polymer.

By using such DNA chains, a marker is obtained which is invisible to the naked eye with more than $10^{18}$ possible unique codes.

The marker from the security mark is compared for identification with that in a DNA database held by a trustworthy third party.

The outer surface of the micro-globules is preferably covered with fluorescent and/or phosphorescent pigment particles. Said pigment particles turn the micro-globules visible when examined under the microscope in light with a pass-band corresponding to the fluorescence or phosphorescence of said pigments.

Etching of the coating is preferably carried out by electrolysis between the coating and an anode. The anode is for example an insoluble titanium anode, comprising a folded sheet, immersed in an aqueous electrolyte. The aqueous electrolyte advantageously comprises a mineral acid and its salt or a mineral base and its salt, preferably NaOH+NACI concentrated 10% by weight.

By using a soluble electrode, electrolysis also makes it possible to apply a deposit to the varnish. In order, for instance, to deposit a layer of copper on the varnish, the anode can be a copper anode and the aqueous electrolyte can comprise $CuSO_4$ and $H_2SO_4$.

In a preferred embodiment, the security mark is glued by the surface comprising the varnish onto a final substrate, after first etching the coating. Then, the medium, the intermediate layers and the coating can be removed so that only the varnish appears on the final substrate. If a separating film is included, it suffices to separate the separating film from the final substrate and the varnish appears. In the case of an adhesive mark, it suffices to detach the film from the medium for the coating to be pulled off by the medium to reveal the varnish. In the case of a patch or strap deposited by a hot transfer method, scratching the covering reveals the coating.

The invention also concerns a facility for the manufacture of security marks comprising a feed station supplying a medium with a coating applied, a printing station where varnish is applied to the medium, discharging to an electrolysis station where the medium is etched, a washing plant to clean the surface of the medium, a drying station, an inspection station and a winding station.

In a preferred embodiment, the printing station is a photogravure printing station. By means of a photogravure window, the photogravure printing station enables a motif to be printed on a web with very great precision.

In another preferred embodiment, the printing station is a digital printing station. Said station also enables a motif to be printed with very great precision, though preparation of a window is not necessary, with the result that printing is faster and cheaper.

The facility comprises an electrolysis station at which are arranged insoluble electrodes immersed in a live electrolyte permitting rapid corrosion of the unprinted areas of a pre-printed metal or metallized film that kisses the surface of the electrolyte as it passes.

The aqueous solution preferably comprises a salt with its base or associated acid such as NaOH and NaCl in a concentration between 5 and 150 g/l, preferably 100 g/l.

The electrolyte temperature is advantageously between 5 and 80° C. and is preferably 40° C.

The potential difference between the electrodes is DC, between 2 V and 21 V, and is preferably 6 V.

At the electrolysis station, the electrode is a bar of triangular shape having one of the angles of the triangle pointing at the film. This geometry is favourable to the concentration of current flows towards the metal film to be corroded.

The electrode material is a material which is insoluble in the aqueous developing solution, even in the presence of an electric current, such as titanium.

According to another characteristic, the facility comprises a set of machines and equipment comprising a treatment zone with soluble electrodes immersed in a live electrolyte for rapid deposit on to a film pre-printed with windows.

In this facility, the developing solution is an electrolyte comprising a salt with its base or associated acid such as $CuCl_2$ and HCl in a concentration between 5 and 150 g/l and preferably 100 g/l.

It is also advantageous for the current across the electrode terminals to be a direct current applied at a voltage between 5 and 30 V, preferably 6 V.

According to an advantageous characteristic, the electrode bar section has a geometry favourable to dissolution of the electrode metal, thus a maximum area in contact with the electrolyte, for example a circular section.

In this case, the electrode material is a material soluble in the electrolyte, such as copper in order to deposit a copper film.

Advantageously, the anodes and cathodes are immersed in parallel, separated from one another by isolating partitions, perpendicular to the film path, in the window developing solution, at a distance of a few millimeters from the film, preferably 1 mm at most, which kisses the surface of the electrolyte but is not immersed in it.

According to an embodiment of the invention, the electrode bar section has a geometry favourable to concentration of current flows towards the metal film to be corroded and favourable to its dissolution in the electrolyte, preferably having a drop shape with the point of the drop pointing towards the film.

In a preferred embodiment, the electrolysis station comprises an electrolysis tank with partitions. This allows a succession of soluble and insoluble anodes to be used in the electrolysis tank with suitable electrolytes. In this way, the medium can be successively etched then covered with a deposit localised on the varnish. The result obtained is multi-layers which are marked on the printed varnish.

The facility can comprise a set of machines and equipment comprising a washing zone with drying taking place between steel rollers and polymer rollers to limit carry-over and facilitate drying by evaporation of the washing liquid, such that the soluble varnish is dissolved and the treated film is dry and has no traces of electrolyte incompatible with its subsequent use.

Advantageously, the facility comprises a set of machines and equipment arranged in series so as to comprise one machine with several separate stations, to keep printing separate from the other operations which are, in turn, grouped together on a second machine.

Preferably, the facility comprises a set of machines and equipment comprising two inspection zones between printing and treatment and a third inspection zone after drying, fitted with sensors for continuous detection of the conductivity of the different zones and video cameras to monitor the resolution standard at the different stages of operations.

The invention also concerns a security mark comprising a medium made from a material which is transparent in visible light, a coating applied to one surface of the medium and a varnish covering at least part of the coated surface of the medium, the varnish being applied to the medium in a motif which is invisible to the naked eye.

The medium is preferably a polymer film such as a polyester film. This polymer film advantageously has special characteristics compatible with the use of the end-product, such as tear resistance and temperature resistance properties allowing it to be used in hot transfer printing. The film used will preferably be bi-oriented polyester between 16 and 100 μm thick, preferably between 16 and 23 μm.

The polymer medium film preferably has characteristics compatible with the use of the end-product, such as appropriate tear resistance when wire cut and suitable density for use in making films partly or completely immersed in the paper.

The polymer medium film has, if applicable, characteristics that make it suitable for the use of the end-product, such as capability of lamination, hence wetability or surface tension capability, between 37 and 55 DIN, preferably 42 DIN, for the making of separating film.

The coating preferably comprises one or more metals, one or more metal oxides, one or more metalloids, and/or mixtures of these obtained by vacuum sublimation.

Between the coating and the varnish is advantageously deposited one or more intermediate layers. Such intermediate layer can, for instance, be an intermediate separating layer preferably made of polymer wax, the role of which is to break when detached from the subsequent layers and from the medium. The intermediate layer can also be an intermediate relief layer comprising a varnish made of polymer, preferably polyurethane, the role of which is to protect the final layer and or to be hot-stampable and pressure-stampable. Stamping enables micro-reliefs to be created that constitute variable diffracting optical motifs and/or holographic motifs.

The coating can be comprised of several layers, namely a first separating layer, a second layer to protect the next layer and a third layer, of one or metals, one or more metal oxides, one or more metalloids or a mixture of these which is vacuum-deposited, which has been treated, printed with a varnish, charged with at least one marker, laser etched and/or modified by digital printing, treated by electrolysis, coated with a bonding layer, a second layer comprised of a catalytic varnish and a third layer, comprised of one or more heat-fusible polymers to create a material which is suitable, after cutting and winding, for hot transfer printing to make secure fiduciary documents and other papers such as passports, identity cards, driving licences, registration plates, banknotes, cheques and packaging.

The varnish is advantageously a varnished charged with a marker in the form of micro-globules comprising a DNA chain. To the micro-globules can be attached fluorophores the presence of which can be verified with the aid of a microscope comprising a light source with a wavelength between 3,000 and 4,000 Å, fitted with a filter.

The coating polymer comprising the micro-globules forms an entity which is resistant not only to the printing environment but also to environments where the marked product is to be used.

The DNA molecules are preferably synthesized to constitute a unique code that can be recognized after chain amplification by comparison to that stored in a database held by a trustworthy third party.

DESCRIPTION WITH REFERENCE TO THE FIGURES

Other special features and characteristics of the invention will become clear from the detailed description of some advantageous embodiments given below, by way of illustration, with reference to the attached drawings. These show:

FIG. 1: Sectional view of a film during the different stages (A, B and C) of production (coated medium, varnish, electrolytic etching)

FIG. 2: Sectional view of a film during the different stages (A, B, C and D) of production (coated medium, varnish, laser etching, electrolytic etching)

FIG. 3: Sectional view of a film during the different stages (A, B, C, D and E) of production (coated medium, varnish, electrolytic etching, gluing, removal of layers)

FIG. 4: Micro-globules

FIG. 5: General arrangement of a machine for carrying out of the process

FIG. 6: Schematic view of a photogravure printing assembly

FIG. 7: Top view of photogravure printing assembly

FIG. 8: Desired shape of an imprint

FIG. 9: Photogravure window (etched area with continuity line in contact with the etched cells)

FIG. 10: Photogravure window (etched area with continuity line not in contact with the etched cells)

FIG. 11: Printed result

FIG. 12: Schematic view of a film physico-chemical treatment assembly

FIG. 13: Top view of film physico-chemical treatment assembly

FIG. 14: Perspective view of film physico-chemical treatment assembly

FIG. 15: Hybridisation of the DNA sample with its twin from the database

On the figures, the same reference numbers denote identical or similar elements.

FIG. 1A shows a sectional view through a film medium 10 coated with an intermediate layer 12 and a metal layer 14. Holograms 16, 18 are integrated into the intermediate layer 12. On the metal layer is printed (FIG. 1B) a discontinuous layer 20 of varnish. In FIG. 1C, the metal layer has been removed by electrolysis at the places where varnish has not been applied.

FIG. 2A shows a sectional view through a film medium 10 coated with an intermediate layer 12 containing holograms 16, 18 and a metal layer 14, on which—in FIG. 2B—is printed a layer 20 of varnish. One of the holograms 18 constitutes a spot which can be used to check film unwinding. The varnish is printed everywhere on the film except for the spots 18. It is then laser etched (FIG. 2C) to partly destroy the varnish and thus modify the print motif. In FIG. 2D, the metal layer has been removed by electrolysis in those places where varnish has not been applied or where the varnish has been removed by laser etching, respectively.

FIG. 3A shows a section through a film medium 10 coated with an intermediate layer 12 and a metal layer 14, on which—in FIG. 3B—is printed a discontinuous layer 20 of varnish. The varnish contains micro-globules 22 (FIG. 4) under one micron in size, to which have previously been attached stable trace elements so as to constitute a coded DNA chain. The film is then etched (FIG. 3C) so as to remove the metal layer 14 at those places not protected by the varnish 20. Glue 24 is used to attach a final substrate 26 to the varnish 20 (FIG. 3D) before removing—FIG. 3E—the surface layers over the coating to reveal the latter.

FIG. 5 shows a facility for carrying out of the process described above. This facility comprises a feed station A to which is delivered the film with its base deposit BA1, wound on a reel. At this feed station, the reel is unwound to feed a printing station B; then, on leaving the printing station, the web BA2 enters an electrolysis station C where physico-chemical treatment is carried out on the windows in the film BA3. This electrolysis station C is followed by a washing station D, where any water-soluble varnish is removed, producing the film BA4, and the web is rinsed. The web BA4 then enters a drying station E and, finally, an inspection station F from where it is fed to the winder G.

The feed station A comprises an unwinder A1 carrying the reel A2. This unwinder is driven by a motor controlled by a feeding system A3, which controls the tension of the web BA1. The web then enters the printing station B which, in this example, is a photogravure printing station, comprising a printing assembly (FIGS. 6 and 7) with an ink fountain B1, a gravure cylinder B2 dipping into the ink fountain B1 to cover the surface comprising photogravure cells and the window outline. This cylinder is co-operative with a scraper B3 which removes the surface ink so as to leave only the ink inside the cells or etching. The ink fountain B1 is supplied from a tank B4 containing the coating product by means of a pump B5 and a pipe B6. The tank B4 is fitted with a viscosity detector B6, such as a viscometer, to enable the viscosity of the coating liquid to be controlled.

This photogravure assembly B can be fitted with a system for reading a spot, or marker detectable by a photoelectric cell, arranged on the metallized web and enabling the web to be controlled such that the positioning of the printing window is in register with the motifs on the metallized web comprising graphics which may be pre-printed.

The liquid level in the ink fountain B1 is controlled by means of an overflow B7 which flows back into the tank B4, such that the gravure cylinder B2 is always immersed to the same depth in the ink fountain B1.

The cylinder B2 is co-operative with a press roller B10 positioned above the web BA1, cylinder B2 being underneath the web.

The web BA1 consists schematically, as shown in FIG. 1, of a plastic medium 10 and a base deposit 14, such as a metal.

Turning in the direction of the arrows, the gravure cylinder B2 compresses, with the press roller B10, the web BA1 and deposits imprints of varnish corresponding to the windows or print areas or coatings I corresponding to the windows.

FIG. 7 is a top view of the photogravure printing assembly shown in FIG. 6. This figure shows the gravure cylinder B2, the press roller B10 with an arrow indicating compression and the web BA in top view. The gravure cylinder B2 has a surface which is etched according to a photogravure window or print area B21 of relatively complex shape, which effects printing I of the varnish on the base deposit 14 on the web BA1 (which then becomes web BA2).

FIG. 8 shows the desired outline of the photogravure window, that is to say, the outline of the future graphic (I100).

Starting with this shape I100, the surface of the photogravure window is etched in the cylinder. This window comprises an etched surface having troughs or cells K100, separated by walls K101, the whole being surrounded by a fillet K102, which edges the troughs and the spaces between the troughs K100.

In this figure, the cells are represented by black squares with rounded corners, possibly truncated, separated by walls (partitions, also called bridges) K101, which are white.

The set of cells or troughs is surrounded here by a fillet, that is to say, a very narrow groove which fills with ink but which confines the spreading of the ink from the cells to give the printed image a continuous, precise outline, precisely delimiting the window limit in a predetermined manner.

Figure 9:
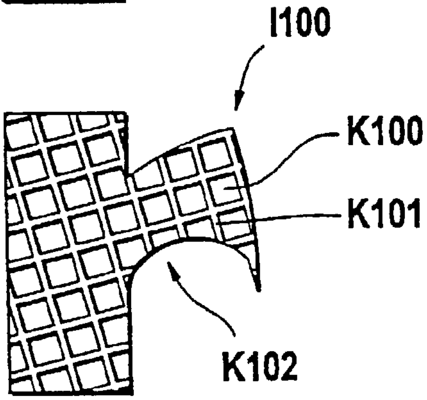

In FIG. 9, this fillet K102 runs over and abuts the troughs or is adjacent to them.

Figure 10:
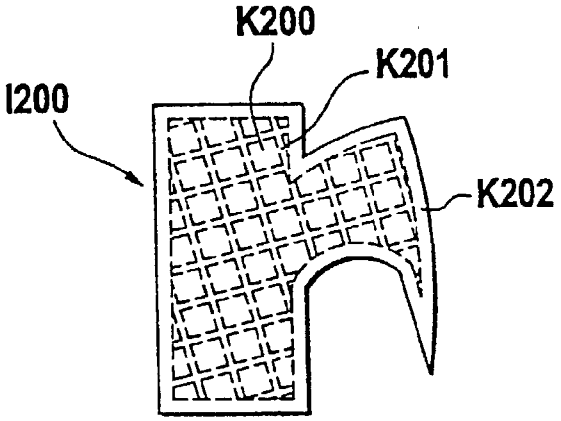

In the case of FIG. 10, the window 1200 also comprises cells K200 separated by walls K201 and the whole is surrounded by a fillet K202 which is farther from the edge of the cells K200 (truncated or not) than in the embodiment according to FIG. 9.

The fineness of the line comprising the fillet depends on the resolution of the scriber drawing the window or windows; thus, the choice of gravure forms in FIGS. 9 and 10 also determines the viscosity of the printing liquid. As stated, once dried this liquid is passivated, that is to say, inert with respect to the physico-chemical action to be performed.

Figure 11:
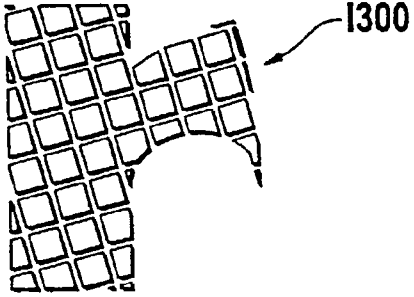

Lastly, FIG. 11 shows the printed image I300 with its very precise outline which is not indented.

Returning to FIG. 5, the electrolysis station C comprises an electrolysis tank C1 which is kissed by the web BA2, after printing at the printing station B. This electrolysis station also comprises a hood C2 to extract the electrolysis gases. Details of station C2 are shown in FIGS. 12, 13 and 14.

Figure 12:
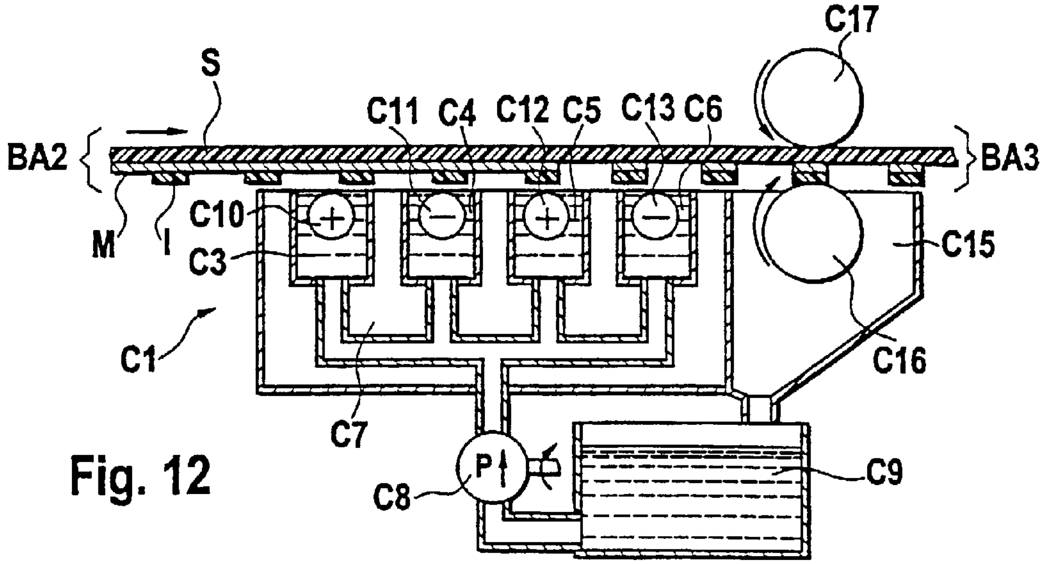

The schematic side view in FIG. 12 of the electrolysis station C shows alternating electrolysis tanks C3, C4, C5 and C6 connected by pipes C7 and a feed pump C8 to an electrolyte tank C9. In fact the web BA2, coated with the coatings I, touches the surface of the liquid in electrolysis tanks C3–C6. Each of these tanks houses an electrode C10, C11, C12 and C13 of opposite polarity and electrolysis takes place from one tank to another.

At the exit there is a collecting hopper C15 which collects the liquid dripping from the web BA3 squeezed out as it passes between two rollers C16, C17. The drained liquid is collected in the hopper C15 before return to the tank C9.

Figure 13:
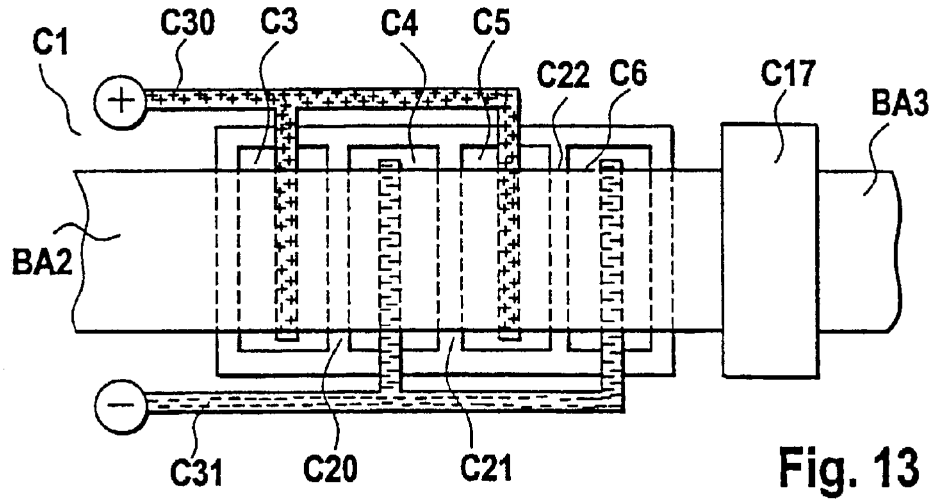
Figure 14:
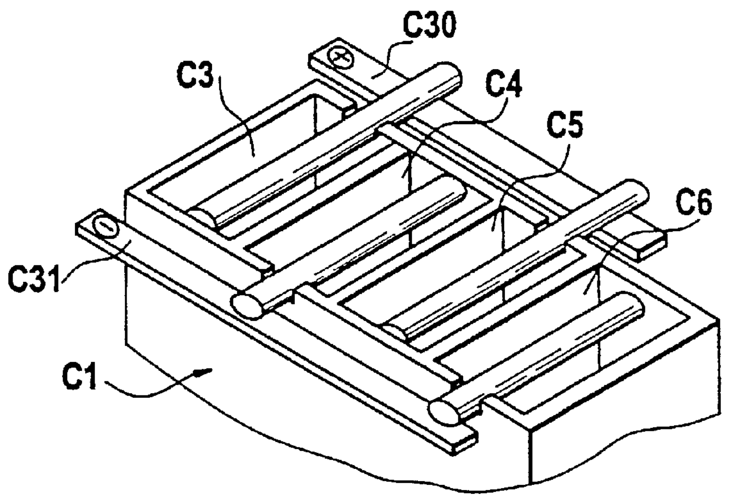

FIG. 13 shows a top view of the electrolysis assembly C1, showing in particular the partitions C20, C21 and C22 between the tanks. This figure also shows how the positive and negative electrodes are connected to a common collector rail C30, C31.

FIG. 14 shows a perspective view of the arrangement of the electrolysis assembly C1. The same reference numbers as above have been used, but the description will not be repeated.

The conditions in which electrolysis takes place depend on the type of metal to undergo electrolysis. The electrodes are non-consumable electrodes, which simply remove the metallisation from the film at the places not protected by the passivation layer, in other words, outside the window outlines.

The situation is different if the aim of electrolysis is to deposit or remove and deposit a metallising layer, as mentioned above.

Finally, the window printing and electrolysis operations can be repeated with different window shapes, one on top of another, for example in order to form an integrated circuit. In this case there will be a succession of stations B, C and possibly D, alternately.

Next, the web BA3 enters the washing station D. At the washing station, the web BA3 is rinsed in order to remove electrolyte residues and dissolve the covering layer, in particular the passivation layer. This washing station D comprises various return cylinders D1 and D2 which take the web BA3 to a first tank D4 and then into a second tank D5. These tanks contain a liquid to rinse the electrolyte and/or solvent and coating. The detailed structure of these rinsing tanks will not be presented. This is a set of rollers defining a route for the web through the washing bath.

The washing process incorporates drying between steel rollers and polymer rollers to limit carry-over and facilitate drying by evaporation of the washing liquid, such that the film is dry and has no traces of electrolyte incompatible with its subsequent use.

Downstream from the washing station D, the web BA4 enters the drying station E which is fitted with means of ventilation and air extraction E1, E2, E3, E4 and, finally the dried web BA5 enters an inspection station F, which is equipped with a video camera F1 which views an area of the film BA5 for the purpose of manufacturing quality control. Said inspection is supplemented by a measurement of optical density and resistivity (not shown). These inspections are performed continuously. On leaving the inspection station F, the film is wound at a winding station G. The winding station is similar in structure to the unwinder A, but works the opposite way round. It comprises an arm G1 which is fitted with a motor and forms the roll G2.

After inspection of the web, the web is fed and wound with tension control to prevent deformation due to the overthick areas.

Figure 1A:
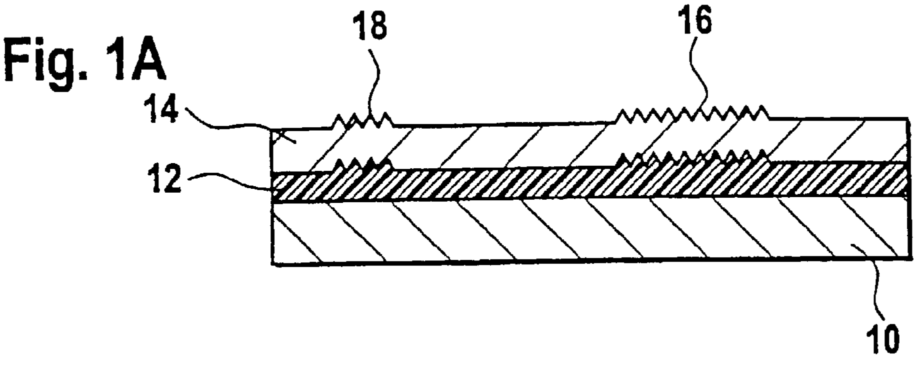
Figure 1B:
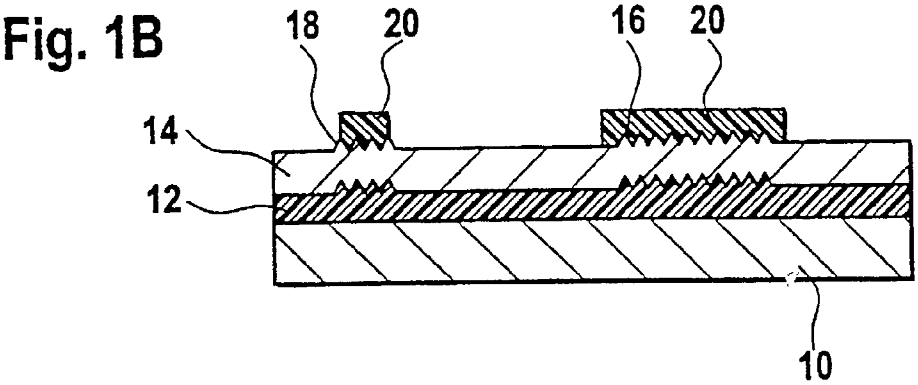
Figure 1C:
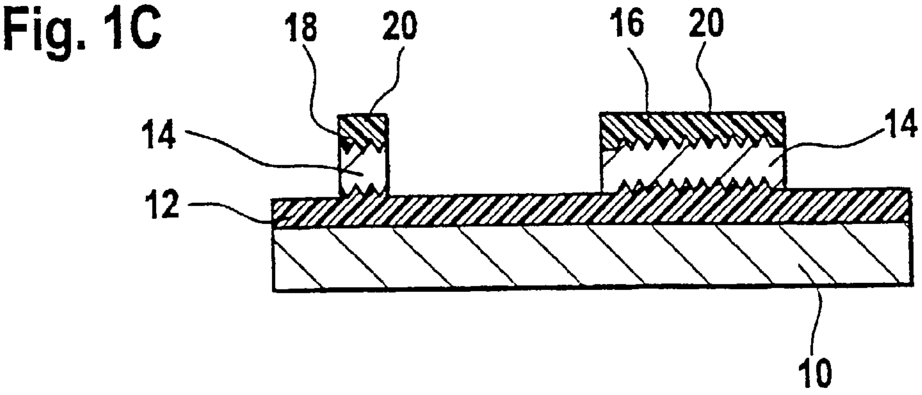
Figure 2A:
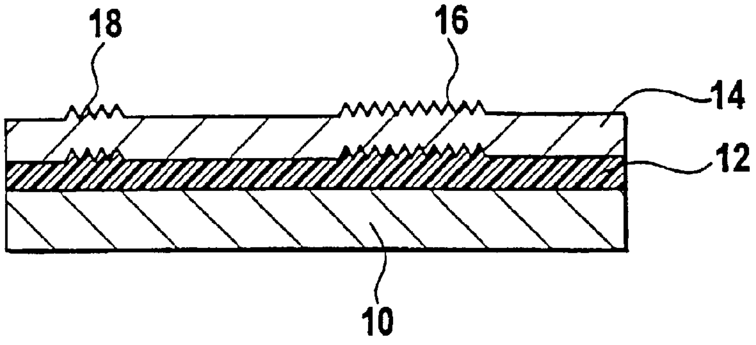
Figure 2B:
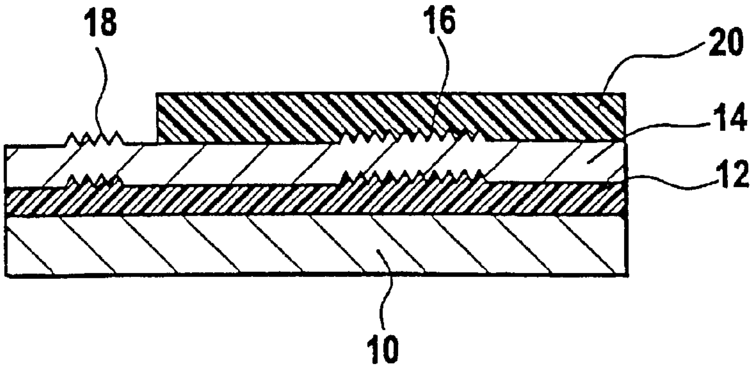
Figure 2C:
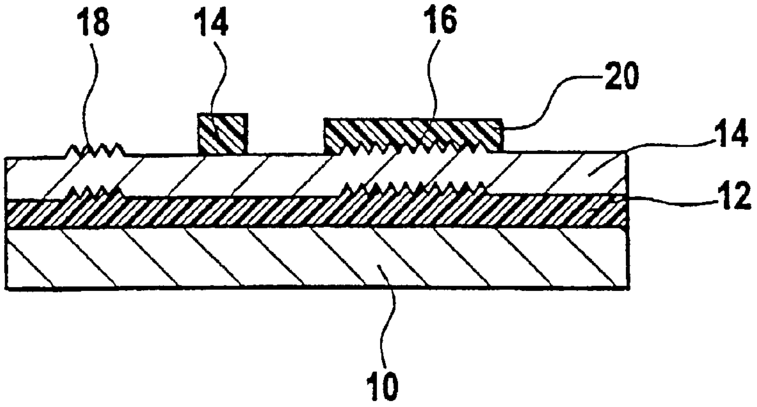
Figure 2D:
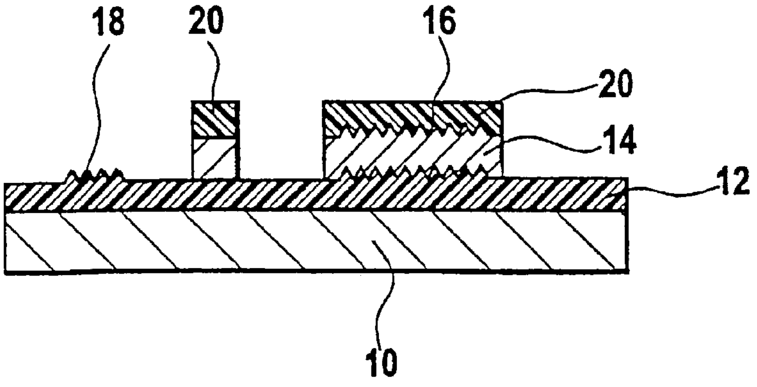
Figure 3A:
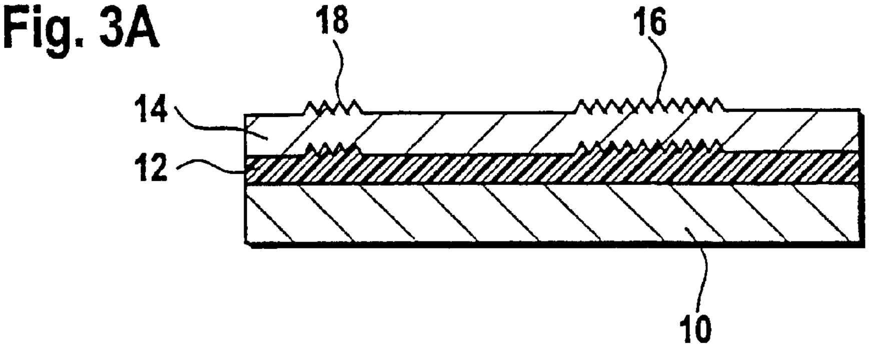
Figure 3B:
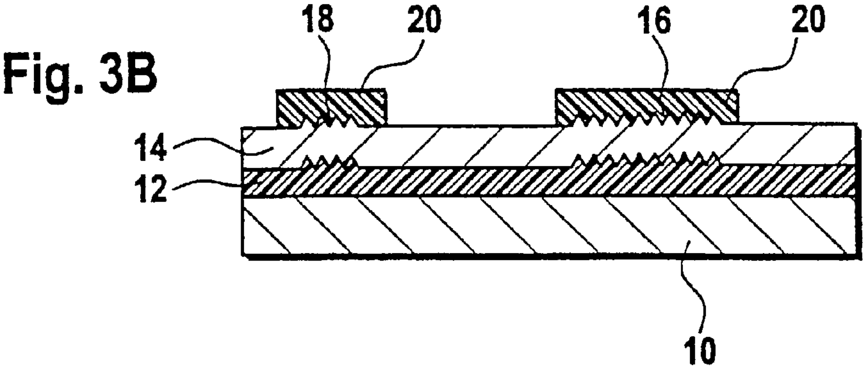
Figure 3C:
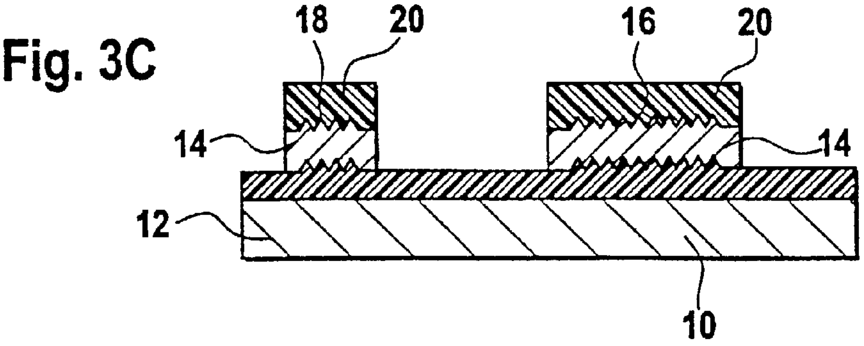
Figure 3D:
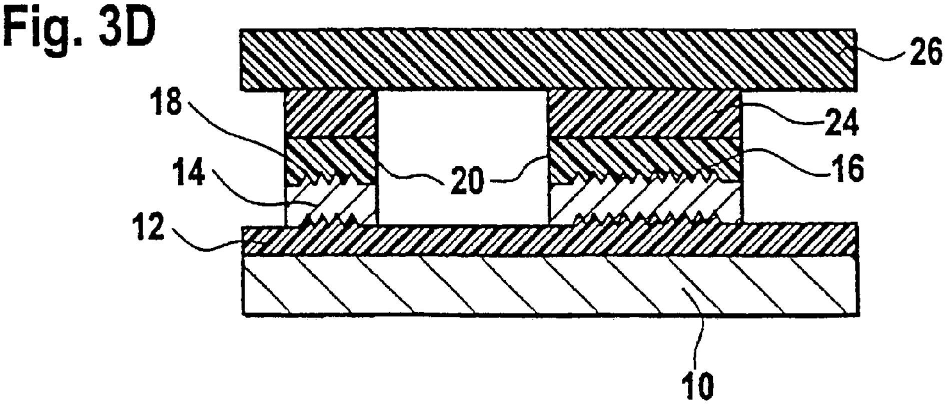
Figure 3E:
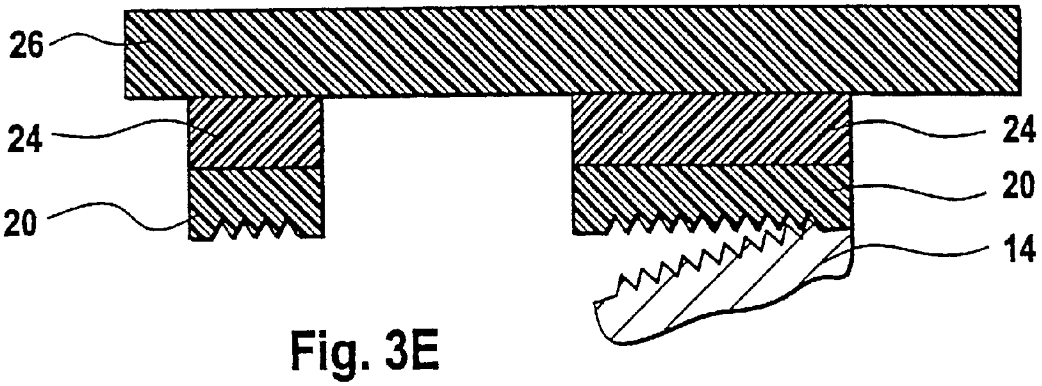
Figure 4:
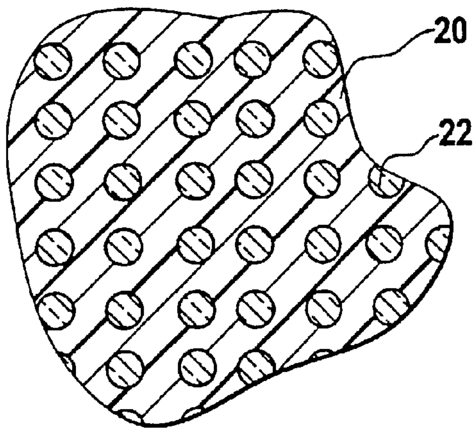
Figure 5:
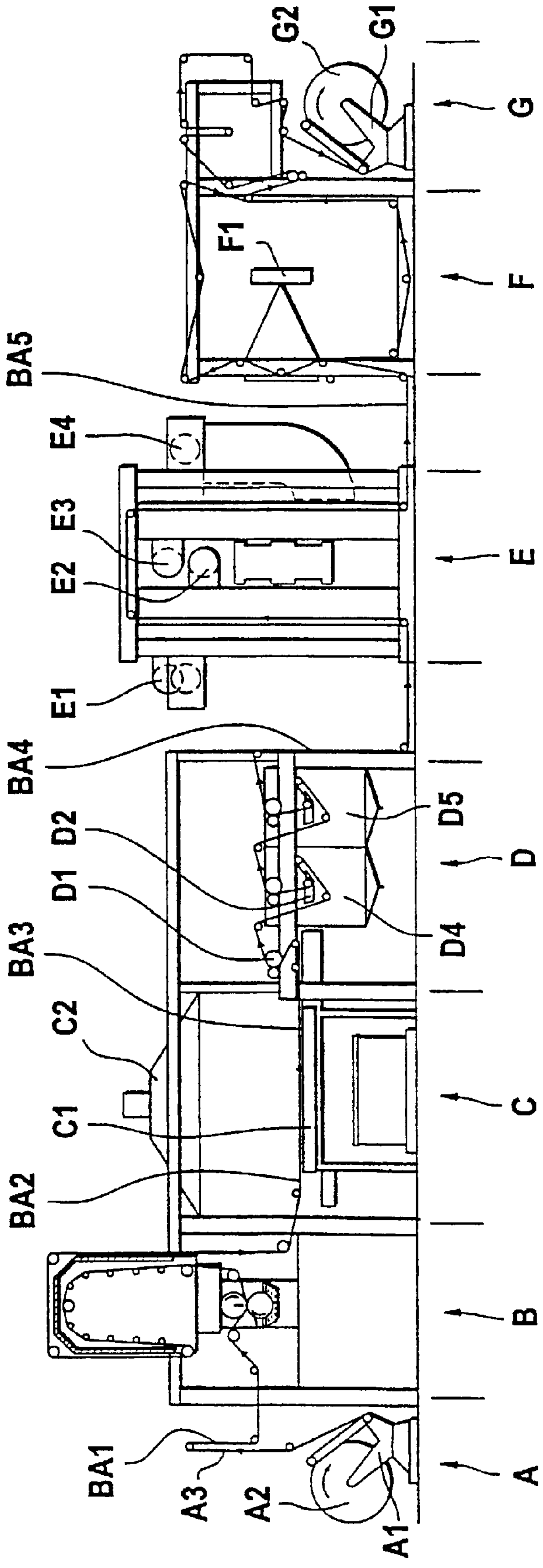
Figure 8:
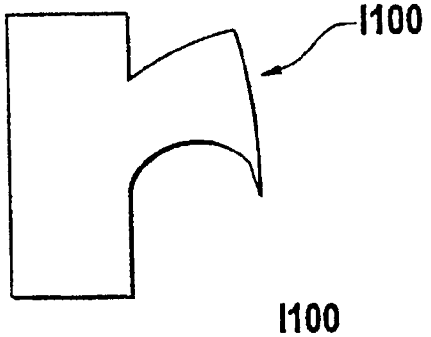
FIGS. 8–11 show more explicitly the construction of the etched surface of the photogravure window.

The web is guided through the facility shown in FIG. 5 in synchronised manner, with the aid of reference marks and readers and also control circuits. Said devices are not shown.

The facility has the advantage of a treatment speed capable of exceeding 250 m/min. The treatment is not sensitive to the presence of metal oxides protecting the metallized surface of the film. This is a notable advantage over the previous chemical process. The possibility of depositing a metal layer of a different type to that which has been corroded allows metal multi-layers to be manufactured.

The resolution of the metallized line that is produced is the printing resolution, because the thickness of the corrosion mask can be 2 microns or less.

Lastly, to facilitate manufacturing operations, the corrosion resist can be printed on a separate machine from the treatment machine.

To establish the nature of the DNA code contained in the micro-globules, a comparison is made with codes stored in a database, searching for the twin that will identify the origin of the product.

The micro-globules are visible in suitable lighting with the aid of a weaver's glass or a lens with magnification greater than 12.

Taking a sample of a few fragments of varnish, approximately 10 micro-globules, is sufficient for the purpose of laboratory analysis in order, after purification and concentration using a column and membrane, to compare the sample DNA code with the DNA reference code database in order to determine the sample code and establish the user of the code corresponding to the sample code, using a DNA amplifier.

Figure 15A:
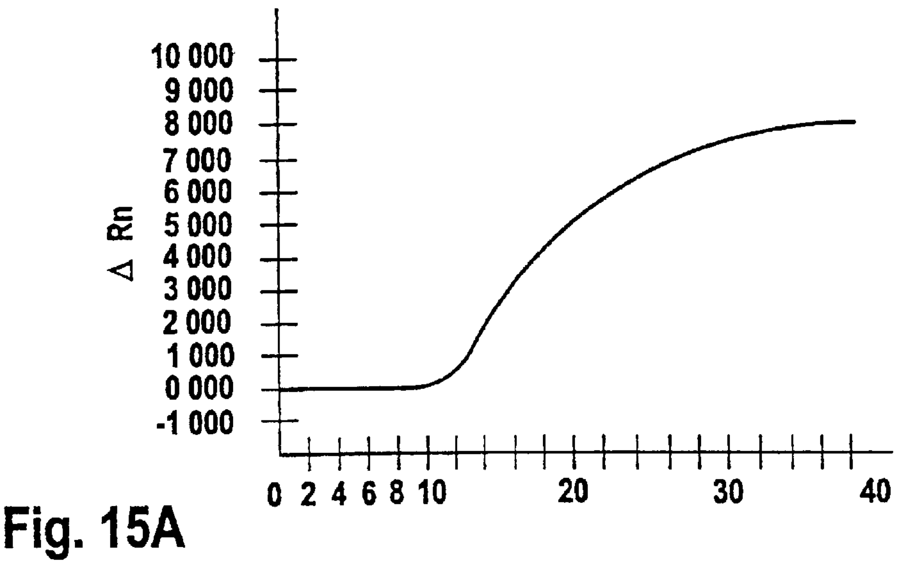
Figure 15B:
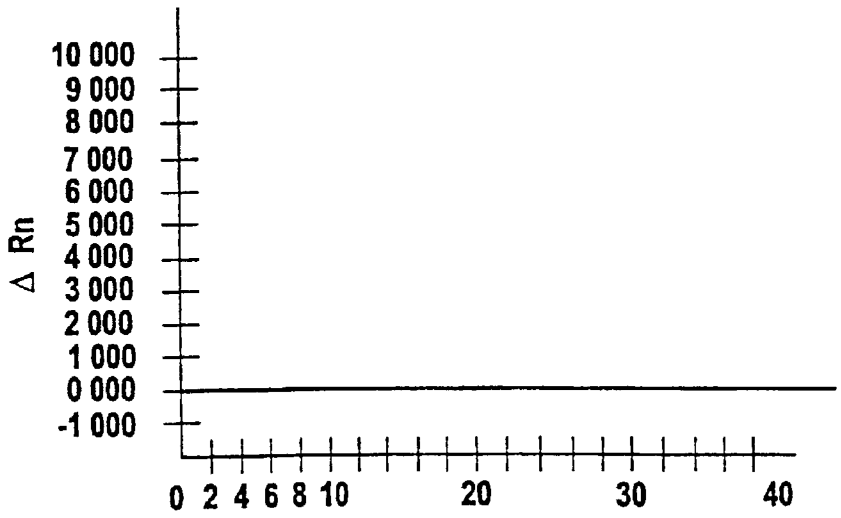

After a series of 40 thermal cycles (30–90° C.), hybridisation of the DNA sample with its twin from the database is sought. The two curves attached show, in FIG. 15A an example of hybridisation and in FIG. 15B the absence of hybridisation, hence correspondence between the sample DNA and that in the database.

In analysis (A), the sample DNA has found its twin and the sample DNA code corresponds to the database DNA code.

What is claimed is:

1. Security mark comprising the following layers:

a medium made of a material which is transparent in visible light;

a coating applied to one surface of the medium, said coating forming a coated area; and a varnish covering at least part of the coated area of the medium where the varnish is arranged on the medium in a pattern which is invisible to the naked eye;

wherein the varnish is a charged varnish;

wherein the varnish is a varnish charged with a marker;

wherein the marker is a marker in the form of micro-globules.

2. Mark as claimed in claim 1, wherein the medium is a polyester film.

3. Mark as claimed in claim 1, wherein the coating comprises one or more metals.

4. Mark as claimed in claim 1, wherein between the coating and the varnish is one or more intermediate layers.

5. Mark as claimed in claim 1, wherein the micro-globules comprise a DNA chain.

6. Mark as claimed in claim 1, wherein fluorophores are attached to the micro-globules.

7. Mark as claimed in claim 1, wherein the mark is integrated into a product or object in order to make it difficult to forge.

8. A security mark comprising the following layers:

a medium made of a material which is transparent in visible light;

a coating applied to one surface of the medium, said coating forming a coated area; and a varnish covering at least part of the coated area of the medium where the varnish is arranged on the medium in a motif which is invisible to the naked eye;

wherein the varnish is a charged varnish;

wherein the varnish is a varnish charged with a marker;

wherein the marker is a marker in the form of micro-globules.

9. Mark as claimed in claim 8, wherein the micro-globules comprise a DNA chain.

10. Mark as claimed in claim 8, wherein fluorophores are attached to the micro-globules.

11. Mark as claimed in claim 8, wherein the medium is a polyester film.

12. mark as claimed in claim 8, wherein the coating comprises one or more metals.

13. Mark as claimed in claim 8, wherein between the coating and the varnish is one or more intermediate layers.

14. Mark as claimed in claim 8, where the coating comprises one or more oxides.

15. Mark as claimed in claim 8, wherein the coating comprises one or more metallic salts.

16. Mark as claimed in claim 8, wherein the coating comprises one or more metalloids.

17. Security mark comprising the following layers:

a medium made of a material which is transparent in visible light;

a coating applied to one surface of the medium, said coating forming a coated area; and a varnish covering at least part of the coated area of the medium where the varnish is arranged on the medium in a pattern which is invisible to the naked eye;

wherein the coating comprises one or more oxides.

18. Security mark comprising the following layers:

a medium made of a material which is transparent in visible light;

a coating applied to one surface of the medium, said coating forming a coated area; and a varnish covering at least part of the coated area of the medium where the varnish is arranged on the medium in a pattern which is invisible to the naked eye;

wherein the coating comprises one or more metallic salts.

19. Security mark comprising the following layers:

a medium made of a material which is transparent in visible light;

a coating applied to one surface of the medium, said coating forming a coated area; and a varnish covering at least part of the coated area of the medium where the varnish is arranged on the medium in a pattern which is invisible to the naked eye;

wherein the coating comprises one or more metalloids.

* * * * *